United States Patent [19]
D'Angelo et al.

[11] Patent Number: 5,929,615
[45] Date of Patent: Jul. 27, 1999

[54] STEP-UP/STEP-DOWN VOLTAGE REGULATOR USING AN MOS SYNCHRONOUS RECTIFIER

[75] Inventors: Kevin P. D'Angelo, Santa Clara; Robert S. Wrathall, Scotts Valley, both of Calif.

[73] Assignee: Impala Linear Corporation, Sunnyvale, Calif.

[21] Appl. No.: 09/158,035

[22] Filed: Sep. 22, 1998

[51] Int. Cl.[6] .............................. G05F 1/613; G05F 1/56
[52] U.S. Cl. .......................... 323/224; 323/222; 323/282
[58] Field of Search .................................... 323/222, 223, 323/224, 266, 270, 273, 282, 284

[56] References Cited

U.S. PATENT DOCUMENTS

| | | | |
|---|---|---|---|
| 4,459,537 | 7/1984 | McWhorter | 323/224 |
| 5,036,269 | 7/1991 | Murari et al. | 323/266 |
| 5,453,678 | 9/1995 | Bertolini et al. | 323/282 |
| 5,721,483 | 2/1998 | Kolluri et al. | 323/224 |
| 5,864,226 | 1/1999 | Wang et al. | 323/273 |

*Primary Examiner*—Matthew Nguyen
*Attorney, Agent, or Firm*—Law Offices of Terry McHugh; Thomas H. Ham; Terry McHugh

[57] ABSTRACT

A circuit and method for providing a voltage regulation despite variations in the supply voltage and/or the load utilize a MOS synchronous rectifier in a flyback topology to perform both step-up and step-down operations. The circuit operates in a boost-type operation until the voltage at an output terminal exceeds a predetermined shut-off voltage. At such time, a duty cycle of the circuit is suspended until the voltage at the output terminal falls below the predetermined shut-off voltage. Triggering the duty cycle and the suspension of the duty cycle are dependent solely upon the voltage at the output terminal. The circuit includes a steering device that connects the body of MOS synchronous rectifier to either its source or its drain to consistently configure the MOS synchronous rectifier in a reverse-biased condition. Preferably, the steering device is comprised of two PMOS transistors that are controlled by the voltages at the source and drain of MOS synchronous rectifier.

21 Claims, 3 Drawing Sheets

STEP-UP/STEP-DOWN VOLTAGE REGULATOR USING AN MOS SYNCHRONOUS RECTIFIER

TECHNICAL FIELD

The invention relates generally to voltage regulators and more particularly to a voltage regulator capable of performing step-up and step-down operations.

DESCRIPTION OF THE RELATED ART

A voltage regulator is designed to provide a well-regulated voltage, regardless of variations in the load resistance and/or the supply voltage. A common type of voltage regulator is known as a switching-mode voltage regulator. There are three conventional topologies typically employed for designing switching-mode voltage regulators. These topologies are the buck (step-down), the boost (step-up), and buck-boost (inverting).

A buck regulator is a forward-mode regulator that provides a regulated output voltage by maintaining a steady-state DC current through an inductor. The steady-state DC current has an average value equal to the output load current and, consequently, regulates the output voltage. However, the buck regulator has a critical limitation. The buck regulator requires that the supply voltage be higher than the regulated voltage. Conversely, a boost regulator requires that the supply voltage be lower than the regulated voltage. The boost regulator is a flyback-mode regulator that provides the regulated output voltage by generating bursts of energy that are temporarily stored. A buck-boost regulator, on the other hand, can operate when the supply voltage is higher or lower than the regulated voltage. However, the buck-boost regulator is an inverting regulator which converts a positive input voltage to a negative voltage. In a battery application, the utilization of the buck-boost regulator would require that all components powered by the regulator be referenced from the generated negative supply, adding complexity to the design of battery-powered devices.

U.S. Pat. No. 5,721,483 to Kolluri et al. describes a DC—DC voltage regulator capable of performing both step-up and step-down operations. The voltage regulator of Kolluri et al. utilizes the boost topology, also known as the flyback topology. FIG. 1 shows a simplified circuit diagram of the voltage regulator 10 of Kolluri et al. The voltage regulator 10 includes a pass element 12 (i.e., a PNP transistor) that is connected in series with an inductor 14 between an input voltage terminal (VIN) and an output voltage terminal (VOUT). The pass element 12 functions as a synchronous rectifier. A rectifier control circuit 16 is coupled to the pass element 12 to selectively activate the pass element 12 at desired intervals during operation thereby regulating the voltage at VOUT. The rectifier control circuit 16 determines the activation of the pass element 12 by sensing the voltages at an LX node 18, the VIN and the VOUT. The rectifier control circuit 16 activates the pass element 12 when the voltage at LX node 18 is above the voltages at both VIN and VOUT. Conversely, the rectifier control circuit 16 deactivates the pass element 12 when the voltage at LX node 18 is equal to or below either the voltage at VIN or the voltage at VOUT.

The voltage regulator 10 also includes a power switch 20 that provides a conduction path between electrical ground and the junction of the inductor 14 and the pass element 12. The power switch 20 is coupled to a switch control circuit 22 that closes and opens the power switch 20. The switch control circuit 22 is connected to the VIN and to the VOUT via a feedback loop 24. The feedback loop 24 includes two resistors 26 and 28 that operate as a voltage divider. Lastly, the voltage regulator 10 includes a capacitor 30 connected between VOUT and ground to store the energy from the inductor 14, during the period when the pass element 12 is conducting.

The voltage regulator 10 operates similarly to the conventional boost voltage regulator. Initially, the power switch 20 is closed, allowing current to be drawn through the inductor 14. During this period, the pass element 12 is not activated since the rectifier control circuit 16 senses that the voltage at LX node 18 is less than the voltage at VIN. After a predetermined time, the switch control circuit 22 opens the power switch 20. The opening of the power switch 20 causes the voltage of the inductor 14 to reverse, increasing the voltage at LX node 18. The rectifier control circuit 16 activates the pass element 12 when the voltage at LX node 18 exceeds the voltage at both VIN and VOUT, raising the voltage at VOUT. By regulating the activation of the pass element 12 and the closing and opening of the switch 20 in response to relative voltages at VIN, the LX node 18 and VOUT, the voltage regulator 10 is able to step-down the input voltage when the voltage at VIN is higher than the voltage at VOUT and to step-up the input voltage when the voltage at VIN is lower than the voltage at VOUT.

Although the prior art voltage regulators operate well for their intended purposes, what is needed is a cost-effective voltage regulator having reduced circuit complexity that can perform both step-up and step-down operations.

SUMMARY OF THE INVENTION

A circuit and method for providing a regulated voltage despite variations in the supply voltage and/or the load utilizes an MOS synchronous rectifier in a flyback topology to perform both step-up and step-down operations. The circuit operates in a boost-type operation until the voltage at an output terminal exceeds a predetermined shut-off voltage. At such time, a duty cycle within the step-up operation of the circuit is suspended until the voltage at the output terminal falls below the predetermined shut-off voltage. When the voltage at the output terminal falls below the predetermined shut-off voltage, the execution of the duty cycle is resumed.

The duty cycle involves activating and deactivating the MOS synchronous rectifier and opening and closing a power switch to provide voltage to the output terminal. Initially, the power switch is closed, connecting an inductor to ground, to allow current to be drawn through the inductor. The inductor is connected between an input voltage terminal and the output terminal. The MOS synchronous rectifier is connected in series with the inductor between the output terminal and the inductor. After a sufficient amount of energy is stored in the inductor, the power switch is turned off, causing the inductor voltage to invert. Therefore, the voltage at an LX node, located between the inductor and the MOS synchronous rectifier, sharply increases. In close synchronization with turning the power switch off, the MOS synchronous rectifier is activated, connecting the inductor to the output terminal. Connected to the output terminal is a capacitor that is configured to receive the stored energy when the MOS synchronous rectifier is activated. The capacitor can then provide current to the load with the received energy.

In order to ensure proper activation and deactivation of the MOS synchronous rectifier, two transistors are configured to connect the "body" (i.e., substrate terminal) of the MOS synchronous rectifier to either the LX node or the output terminal. Preferably, the two transistors and the MOS synchronous rectifier are PMOS transistors. When conducting, the first transistor connects the body of the MOS synchronous rectifier to the LX node. Conversely, the second transistor connects the body of the MOS synchronous rectifier to the output terminal, when the second transistor is in a conductive state. The conductive states of the two transistors are dependent upon the voltages at the LX node and the output terminal. The gate of the first transistor is connected to the output terminal, while the gate of the second transistor is connected to the LX node. Therefore, when the voltage at the LX node is greater than the voltage at the output terminal, only the first transistor is activated, connecting the body of MOS synchronous rectifier to the LX node. In this condition, the MOS synchronous rectifier is reverse-biased. However, when the voltage at the LX node is less than the voltage at the output terminal, only the second transistor is activated, connecting the body of MOS synchronous rectifier to the output terminal. Again, the MOS synchronous rectifier is reverse-biased. The consistent reverse-biased condition of the MOS synchronous rectifier ensures that the rectifier can be deactivated and activated, regardless of the voltages at the LX node and the output terminal.

The duty cycle of the circuit is adjustable and is regulated by control circuitry that is coupled to the power switch and the MOS synchronous rectifier to activate and deactivate the two devices. The control circuitry is able to monitor the voltage at the output terminal by means of a feedback loop that connects the control circuitry to the output terminal. By comparing the voltage at the output terminal to a reference voltage, the control circuitry is able to modify the duty cycle to regulate the voltage at the output terminal. However, when the voltage at the output terminal exceeds the predetermined shut-off voltage, the control circuitry is configured to suspend the duty cycle by deactivating both the power switch and the MOS synchronous rectifier. A comparator may be employed to detect when the voltage at the output terminal has exceeded a predetermined threshold voltage that is established by the reference voltage and a voltage offset in the comparator. The suspension of the duty cycle allows the load demand to lower the voltage at the output terminal. When the voltage at the output terminal falls below the shut-off voltage, the execution of the duty cycle is resumed.

DETAILED DESCRIPTION

Figure 1:
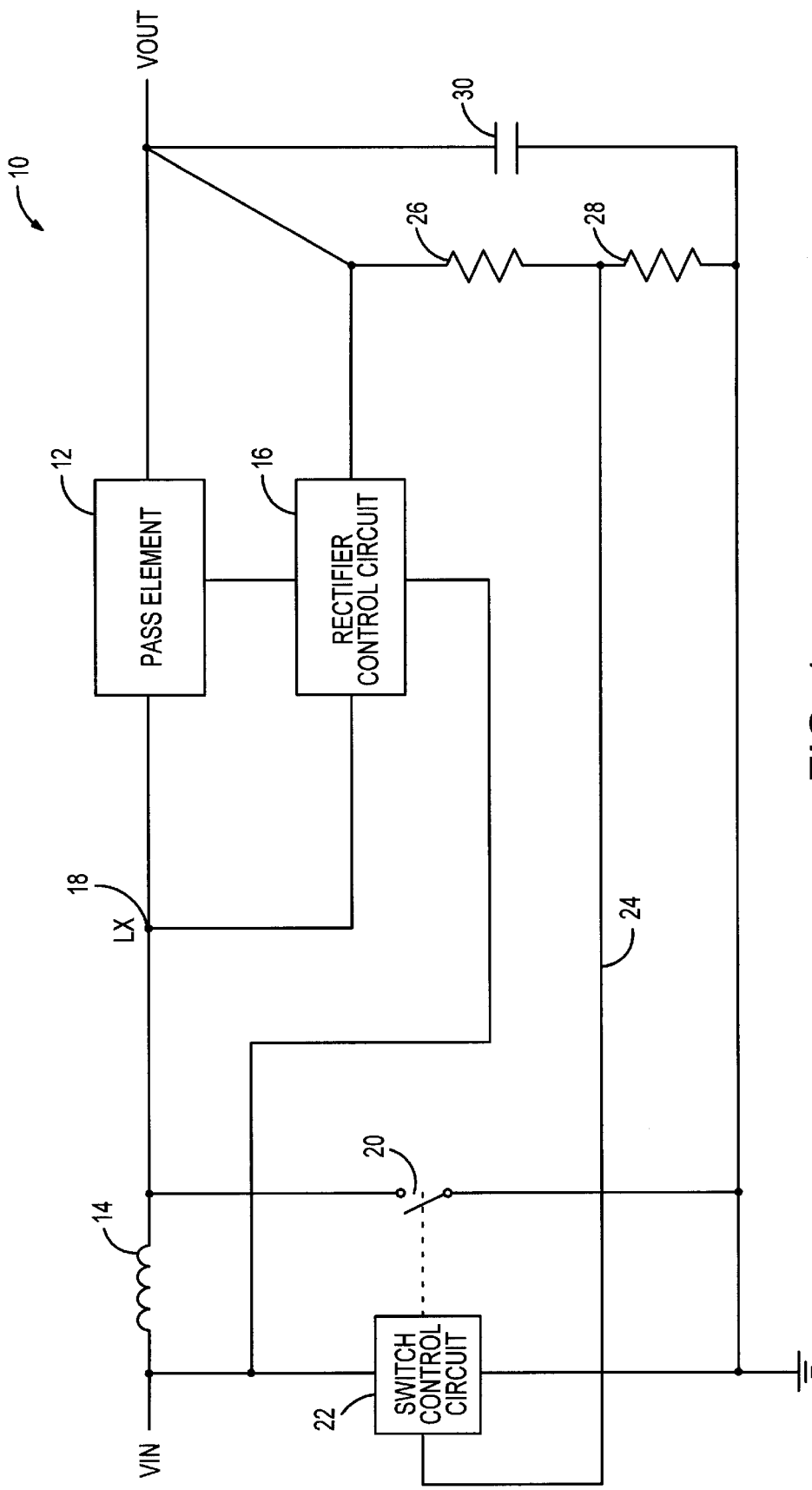
FIG. 1 is a circuit diagram of a prior art voltage regulator capable of performing step-up and step-down operations.
Figure 2:
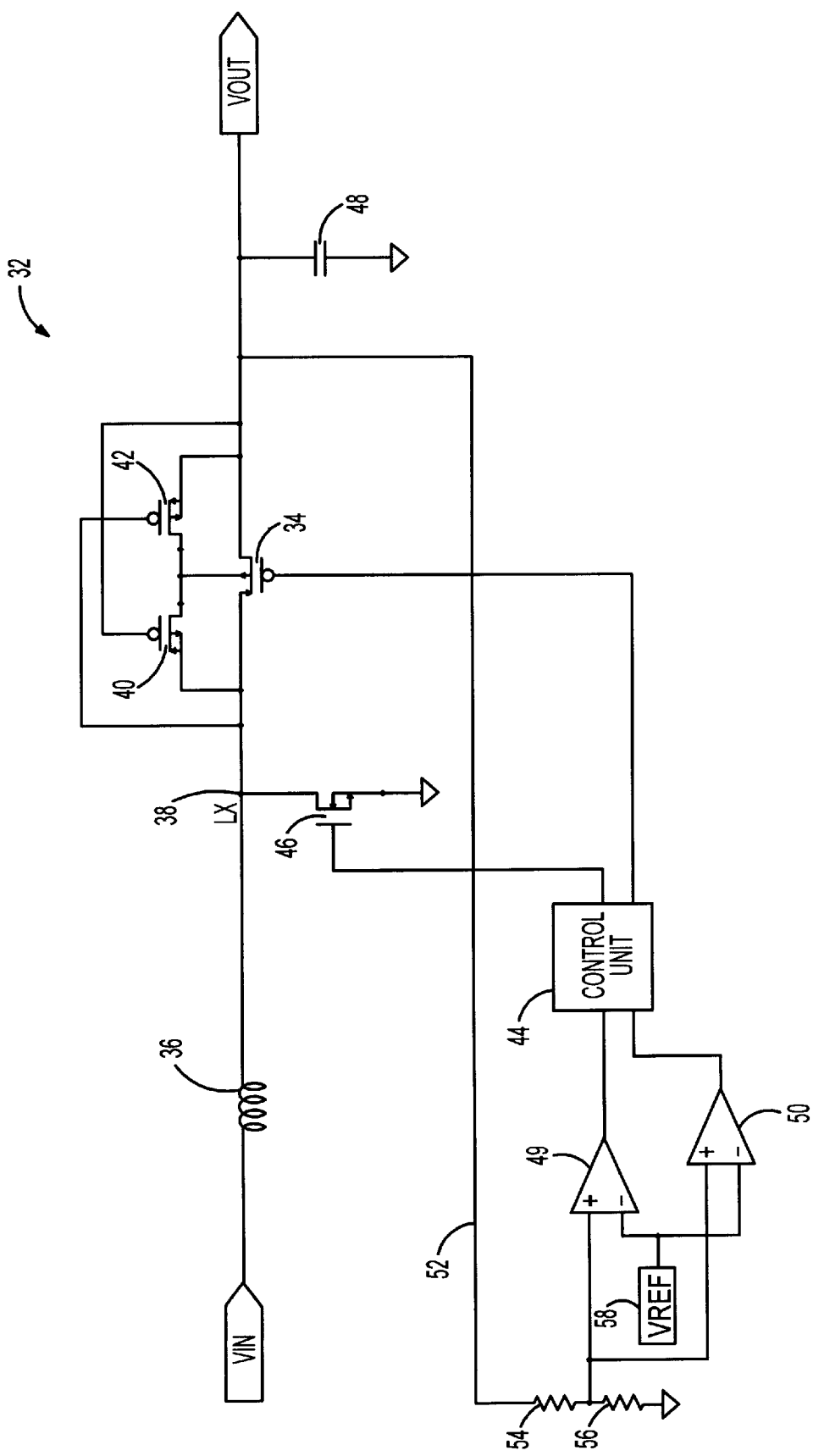
FIG. 2 is a circuit diagram of a voltage regulator having a P-channel metal-oxide-semiconductor transistor as a pass element that is able to perform step-up and step-down operations by sensing the voltage at VOUT in accordance with the present invention.

With reference to FIG. 2, a circuit diagram of a voltage regulator 32 in accordance with the invention is shown. The voltage regulator 32 is designed to perform both step-up and step-down operations. The voltage regulator 32 includes an input voltage terminal (VIN) and an output voltage terminal (VOUT). The VIN may be connected to a positive terminal of a battery. As an example, the battery may be an Li ion battery that provides a voltage ranging from 4.2 V to 2.8 V during the life of the battery. The voltage regulator 32 operates to maintain the voltage at VOUT approximately equal to a target voltage, irrespective of changes in the supply voltage or the load connected to VOUT. As an example, the voltage regulator 32 may be designed to maintain 3.6 V at VOUT, even though the supply voltage at VIN may be anywhere between 4.2 V to 2.8 V.

The voltage regulator 32 includes a P-channel metal-oxide-semiconductor (PMOS) transistor 34 and an inductor 36 that are connected in series between VIN and VOUT. The PMOS transistor 34 functions as a synchronous rectifier. The source of PMOS transistor 34 is coupled to an LX node 38 along the path from the PMOS transistor 34 to the inductor 36, while the drain of PMOS transistor 34 is coupled to VOUT. The body or substrate of PMOS transistor 34 is connected to drains of two MOS transistors 40 and 42. The MOS transistors 40 and 42 are preferably P-channel devices. The gate of PMOS transistor 34 is coupled to a control unit 44 that regulates the activation of transistor 34.

The MOS transistors 40 and 42 are configured around the PMOS transistor 34 such that the voltages at the LX node 38 and VOUT determine the electrical connection of the body of PMOS transistor 34 to either the LX node 38 or VOUT. In other words, the MOS transistors 40 and 42 determine the body connection of PMOS transistor 34 to either its source or its drain. The MOS transistor 40 is configured such that the source of transistor 40 is coupled to the LX node 38. However, the gate of MOS transistor 40 is connected to VOUT. Similarly, the MOS transistor 42 is configured such that the source of transistor 42 is coupled to VOUT, while the gate of MOS transistor 42 is connected to the LX node 38.

The MOS transistors 40 and 42 automatically operate to connect the body of PMOS transistor 34 to either the LX node 38 or VOUT, whichever has a higher voltage potential. By connecting the body of PMOS transistor 34 to the higher voltage potential, the inherent diode of PMOS transistor 34 is always reverse-biased to ensure that the PMOS transistor 34 can be properly activated and deactivated such that the PMOS transistor 34 is in a desired conductive state. That is, the connection of the body of PMOS transistor 34 to the higher potential ensures that the transistor 34 is not conducting when the control unit 44 is trying to turn "off" the transistor 34, regardless of the voltages at the drain and source of PMOS transistor 34. Similarly, the connection of the body of PMOS transistor 34 to the higher potential ensures that the transistor 34 is conducting when the control unit 44 has turned "on" the transistor 34.

The operation of transistors 40 and 42 is dependent upon the voltages at the LX node and VOUT. When the voltage at the LX node is greater than the voltage at VOUT, the voltage at the gate of MOS transistor 40 is lower than the voltage at the source of transistor 40, turning "on" the MOS transistor 40. The activation of MOS transistor 40 connects the body of PMOS transistor 34 to the LX node. Furthermore, the voltage at the gate of MOS transistor 42 is greater than the voltage at the source of the transistor 42, turning "off" the MOS transistor 42. The deactivation of MOS transistor 42 ensures that the body of the PMOS transistor 34 is not also connected to the VOUT. Conversely, when the voltage at the LX node is lower than the voltage at VOUT, only the MOS transistor 42 conducts, connecting the body of the PMOS transistor 34 to VOUT.

The voltage regulator 32 also includes an N-channel metal-oxide-semiconductor (NMOS) transistor 46 that functions as a power switch. The NMOS transistor 46 provides a conduction path from the LX node 38 to ground. The gate of NMOS transistor 46 is connected to the control unit 44. Therefore, the control unit 44 effectively controls both the PMOS and NMOS transistors 34 and 46. The NMOS transistor 46 operates to allow the inductor 36 to store energy during a period when the NMOS transistor 46 is turned "on." Furthermore, the NMOS transistor 46 operates to allow the stored energy in the inductor 36 to be transmitted to a capacitor 48 through the PMOS transistor 34 by causing an inductor voltage inversion when the NMOS transistor 46 turns "off." The capacitor 48 is connected between VOUT and ground. The capacitor 48 serves to transfer the stored energy in the inductor 36 to the load.

In order for the control unit 44 to effectively regulate the activation of PMOS and NMOS transistors 34 and 46, the control unit 44 is operatively connected to an error amplifier 49 and a comparator 50. The error amplifier 49 and the comparator 50 both receive a divided voltage of the voltage at VOUT to provide the control unit 44 with information regarding the voltage at VOUT. A feedback loop 52 from VOUT to a pair of resistors 54 and 56, functioning as a voltage divider, allows the error amplifier 49 and the comparator 50 to receive the divided voltage. The divided voltage from VOUT is compared by the error amplifier 49 and the comparator 50 with a reference voltage that is generated by a reference generator 58. As an example, the reference voltage provided by the reference generator 58 may be 1.25 V, and the resistors 54 and 56 may have electrical resistances such that the divided voltage will equal the reference voltage when the voltage at VOUT is 3.6 V.

The comparator 50 operates to alert the control unit 44 when the voltage at VOUT reaches a shut-off voltage, i.e., a predetermined threshold above the regulated voltage. The predetermined threshold may be set by a voltage offset included within the comparator 50. As an example, the comparator 50 may be configured to signal the control unit 44 when the voltage at VOUT exceeds the desired output voltage of 3.6 V by at least 0.05 V. In this example, the comparator 50 would alert the control unit 44 when the voltage at VOUT is equal to or greater than 3.65 V. The control unit 44 is configured to shut down both the PMOS and NMOS transistors 34 and 46 when the comparator 50 determines that the voltage at VOUT has exceeded the regulated voltage by the predetermined threshold.

During a shut down procedure of both the PMOS and NMOS transistors 34 and 46, any excess current in the inductor 36 is dissipated through the PMOS transistor 34 to the capacitor 48. In the preferred embodiment, the control unit 44 is electrically coupled to VOUT such that the control unit 44 is powered by the voltage at VOUT. Furthermore, the control unit 44 is configured to hold the voltage at the gate of PMOS transistor equal to the voltage at VOUT, during the shut down procedure. When the NMOS transistor 46 is deactivated and the gate of PMOS transistor 34 is held at the voltage at VOUT to implement the shut down procedure, the voltage at the LX node 38 rises, due to an inductor voltage inversion. The increase in the voltage at the LX node 38 creates a gate-to-source voltage potential on the PMOS transistor 34, triggering the PMOS transistor 34 into a conductive mode. Therefore, the excess current in the inductor 36 is discharged to the capacitor through the conducting PMOS transistor 34. As the excess current is discharged, the voltage at the LX node 38 decreases, eventually turning "off" the PMOS transistor 34.

However, if the voltage at VOUT is below the shut-off voltage, the comparator 50 is inactive and will remain inactive until the voltage at VOUT reaches the shut-off voltage. During the inactive state of the comparator 50, the error amplifier 49 interacts with the control unit 44 to regulate the voltage at VOUT. The error amplifier 49 indicates whether the voltage at VOUT is below or above the regulated voltage by comparing the divided voltage from the feedback loop 52 to the reference voltage from the reference generator 58. When the voltage at VIN is well below the regulated voltage, the error amplifier 49 along with the PMOS and NMOS transistors 34 and 46 and the control unit 44 operate as a conventional boost regulator using a variable length duty cycle to maintain the voltage at VOUT at the regulated voltage. At levels when the voltage at VIN is slightly below the regulated voltage or greater, the voltage regulator 32 continues to try to regulate the voltage at VOUT using the same switch-mode operation. However, if the voltage at VOUT exceeds the regulated voltage by the predetermined threshold, the comparator 50 signals the control unit 44 to shut down the PMOS and NMOS transistors 34 and 46. The shut down of the transistors 34 and 46 allows the load demand to catch up with the power delivering capability of the voltage regulator 32. When the load demand lowers the voltage at VOUT below the shut-off voltage, the voltage regulator 32 becomes active and again operates utilizing the variable-length duty cycle in a boost-type operation.

The operation of the voltage regulator 32 can be described as a modified boost regulation. When the voltage at VIN is well below the desired voltage, i.e., the regulated voltage, the voltage regulator 32 operates as a typical boost regulator. Initially, the PMOS transistor 34 is deactivated to disconnect the capacitor 48 from the inductor 36. Meanwhile, the NMOS transistor 46 is activated to draw current through the inductor 36, storing energy into the inductor. The activation and deactivation of the PMOS and NMOS transistors 34 and 46 are controlled by the control unit 44. After a sufficient amount of energy has been stored in the inductor 36, the control unit 44 turns "off" the NMOS transistor 46, causing the inductor voltage to invert. The inversion of the inductor voltage raises the voltage at the LX node 38. Following the deactivation of the NMOS transistor 46, the control unit 44 turns "on" the PMOS transistor 34, connecting the inductor 36 to the capacitor 48. The stored energy in the inductor 36 is transferred to the capacitor 48 when the PMOS transistor 34 is activated. The transferred energy in the capacitor 48 provides power to the load connected to VOUT. This cycle is repeated in accordance to the variable-length duty cycle to provide an average current to the load to regulate the voltage at VOUT.

As the voltage at VOUT fluctuates, the duty cycle of the voltage regulator 32 is adjusted by the control unit 44 in response to a signal from the error amplifier 49. The error amplifier 49 receives the divided voltage, which is the voltage at VOUT that has been proportionally lowered by the resistors 54 and 56. The resistors 54 and 56 function as a voltage divider. The divided voltage is compared by the error amplifier 49 with the reference voltage generated by the reference generator 58. The reference generator 58 and the resistors 54 and 56 are configured such that when the voltage at VOUT equals the regulated voltage, the divided voltage equals the reference voltage. The error amplifier 49 provides the control unit 44 with the result of the comparison of the divided voltage to the reference voltage. The control unit 44 then is able to adjust the duty cycle of the voltage regulator 32 in response to the voltage at VOUT. By adjusting the duty cycle, the voltage regulator 32 is able to regulate the voltage at VOUT, even when the voltage at VIN changes.

However, when the voltage at VIN is very close to the regulated voltage or is greater, the switch-mode operation of the voltage regulator 32 may be unable to regulate the voltage at VOUT. That is, the voltage regulator 32 operating in accordance to the duty cycle is unable to maintain the regulated voltage at VOUT. The exact voltage at VIN when this occurs varies depending upon the load. In the above situation, the voltage at VOUT begins to increase beyond the regulated voltage. When the voltage at VOUT exceeds the shut-off voltage, i.e., the regulated voltage plus the predetermined threshold voltage, the comparator 50 alerts the control unit 44 of the status of the voltage at VOUT by outputting a high signal to the control unit 44. The control unit 44, in response to the signal from the comparator 50, deactivates both the PMOS and NMOS transistors 34 and 46, temporarily suspending the switch-mode operation of the voltage regulator 32. The suspension of switch-mode operation allows the stored energy in the capacitor 48 to discharge to the load, lowering the voltage at VOUT. When the voltage at VOUT falls below the shut-off voltage, the comparator 50 terminates the high signal to the control unit 44. The termination of the signal from the comparator 50 indicates to the control unit 44 to resume the switch-mode operation. The voltage regulator 32 then becomes active and operates under the duty cycle in a boost regulator-type operation, until a next time that the voltage at VOUT exceeds the shut-off voltage. At such time, the control unit 44 deactivates the PMOS and NMOS transistors 34 and 46, and the process is repeated.

During the above process, the MOS transistors 40 and 42 are automatically connecting the body of PMOS transistor 34 to either the LX node or VOUT. When the voltage at the LX node is greater than the voltage at VOUT, only the MOS transistor 40 is activated, connecting the body of PMOS transistor 34 to the LX node. Therefore, the PMOS transistor 34 is in a reverse-biased condition. When the voltage at the LX node is less than the voltage at VOUT, only the MOS transistor 42 is activated, connecting the body of PMOS transistor 34 to VOUT. Thus, the PMOS transistor 34 is again in the reverse-biased condition. The consistent reverse-biased condition of PMOS transistor 34 facilitates effective activation and deactivation of the transistor 34 by the control unit 44.

Figure 3:
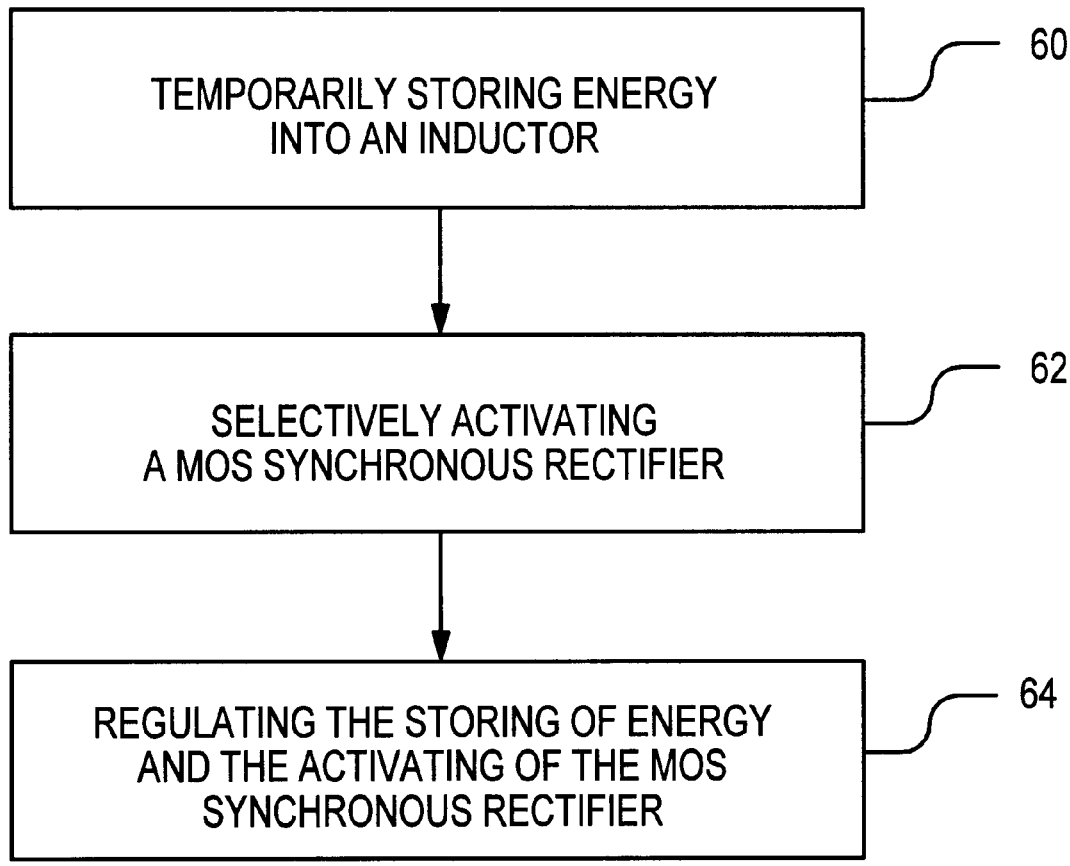
FIG. 3 is a flow diagram of a method of providing a voltage regulation in accordance with the present invention.

A method of providing a voltage regulation in accordance with the invention will be described with reference to FIG. 3. At step 60, energy is temporarily stored into an inductor by allowing current to be drawn through the inductor. This is accomplished by closing a power switch that connects an input voltage terminal to a low voltage (e.g., ground) through the inductor. Simultaneously, a synchronous rectifier is deactivated to isolate the inductor from an output terminal. At step 62, the synchronous rectifier is activated to provide a conduction path from the inductor to a capacitor that is coupled to the output terminal. Prior to the activation of the synchronous rectifier, the power switch is opened to isolate the input voltage terminal from the low voltage. In the preferred embodiment, the synchronous rectifier is a PMOS transistor. In order to ensure that the synchronous rectifier is properly activated and deactivated, the synchronous rectifier is maintained in a reverse-biased condition.

The reverse-biased condition of the synchronous rectifier is maintained by two transistors that are connected to the body of synchronous rectifier. Preferably, the two transistors are also MOS transistors. The first transistor connects the body of the synchronous rectifier to an LX node located between the inductor and the synchronous rectifier, when the first transistor is in a conductive state. Similarly, the second transistor connects the body of synchronous rectifier to the output terminal, when the second transistor is in a conductive state. The two transistors are configured such that when the voltage at the LX node is greater than the voltage at the output terminal, only the first transistor is in a conductive state. Conversely, when the voltage at the LX node is less than the voltage at the output terminal, only the second conductor is in a conductive state. Thus, the body of the synchronous rectifier is always connected to a higher voltage potential side of the synchronous rectifier, maintaining the reverse-biased condition.

At step 64, the storing of energy into the inductor and the activating of the synchronous rectifier are regulated by a control device that is connected to the gates of the synchronous rectifier and the power switch. The control device provides the regulation in accordance to a duty cycle that is responsive to the voltage at the output terminal. The duty cycle is adjustable and is maintained by the control device until the voltage at the output terminal exceeds a predetermined shut-off voltage that is the sum of desired regulated voltage and a predetermine threshold voltage. At such time, the control device suspends the repetitive cycling of storing of the energy into the inductor and the activating of the synchronous rectifier until the voltage at the output terminal falls below the shut-off voltage. By operating the circuit according to the duty cycle along with the suspension of the duty cycle when the voltage at the output terminal exceeds the shut-off voltage, the voltage at the output terminal is maintained at approximately the desired regulated voltage.

What is claimed is:

1. A voltage regulating circuit comprising:
   an inductive means coupled between an input terminal and an output terminal;
   a pass means connected in series with said inductive means to selectively provide a first conduction path from said inductive means to said output terminal, said pass means exhibiting a diode characteristic;
   biasing means coupled to said pass means for regulating said diode characteristic of said pass means in response to a voltage difference across said pass means;
   switching means connecting a junction node to a low voltage terminal for providing a switchable second conduction path from said inductive means to said low voltage terminal, said junction node being located between said pass means and said inductive means; and
   controlling means coupled to said pass means and said switching means for selectively activating and deactivating each of said pass means and said switching means to regulate the voltage at said output terminal, said controlling means being connected to monitor the voltage at said output terminal such that said activation and deactivation of said pass means and said switching means are responsive to the voltage at said output terminal.

2. The circuit of claim 1 wherein said pass means is a metal-oxide-semiconductor (MOS) transistor being connected such that a body of said MOS transistor is coupled to said biasing means and a gate of said MOS transistor is connected to said controlling means.

3. The circuit of claim 2 wherein said biasing means includes a first switch and a second switch, said first switch being positioned to selectively connect said body of said pass means to said junction node at least partially based on the voltage at said output terminal, said second switch being positioned to selectively connect said body of said pass means to said output terminal at least partially based on a voltage at said junction node.

4. The circuit of claim 3 wherein said first switch is a first transistor and said second switch is a second transistor, said first transistor configured to connect the body of said pass means to said junction node when said first transistor is in a conductive state, said second transistor configured to couple the body of said pass means to said output terminal when said second transistor is in a conductive state.

5. The circuit of claim 4 wherein said first transistor has a control node coupled to said output terminal and wherein said second transistor has a control node coupled to said junction node such that said first transistor is in said conductive state when the voltage at said junction node is higher than the voltage at said output terminal and said second transistor is in said conductive state when the voltage at said output terminal is higher than the voltage at said junction node.

6. The circuit of claim 1 wherein said controlling means is configured to monitor the voltage at said output terminal via a feedback loop, said controlling means being operatively disassociated with the voltages at said input terminal and at said junction node.

7. The circuit of claim 6 wherein said controlling means includes an error amplifier connected to said feedback loop, said error amplifier configured to compare the voltage at said output terminal with a reference voltage to monitor fluctuations of the voltage at said output terminal with respect to said reference voltage, said comparison being utilized to determine a duty cycle of said activation of said pass means and said switching means.

8. The circuit of claim 7 wherein said controlling means further includes a means connected to said feedback loop for determining when the voltage at said output terminal exceeds a preselected shut-off voltage, said controlling means being responsive to said determination such that said controlling means deactivates said pass means and said switching means when said preselected shut-off voltage is exceeded.

9. The circuit of claim 8 wherein said determining means is a comparator configured to compare a voltage received via said feedback loop to a substantially fixed reference voltage.

10. A method of providing a voltage regulation comprising steps of:

temporarily storing energy in an inductive element by allowing current to be drawn through said inductive element;

selectively activating a pass element to provide a conductive path from said inductive element to an output terminal, thereby charging a capacitor connected to said output terminal by transfer of said stored energy;

biasing a diode characteristic of said pass element to facilitate said selective activation of said pass element in response to a voltage difference across said pass element; and regulating said storing of said energy in said inductive element and said selective activation of said pass element by sensing the voltage at said output terminal in order to provide said voltage regulation at said output terminal, including suspending said storing and said selective activation when the voltage at said output terminal exceeds a predetermined shut-off voltage.

11. The method of claim 10 wherein said step of biasing said diode characteristic of said pass element includes configuring said pass element such that said diode characteristic is generally reverse-biased.

12. The method of claim 11 wherein said step of configuring said pass element includes selectively connecting a body of said pass element to a source or a drain of said pass element, said pass element being a metal-oxide-semiconductor transistor.

13. The method of 12 wherein said step of connecting the body of said pass element includes activating one of two transistors to provide said connection of said body of said pass element to the source or the drain of said pass element.

14. The method of claim 12 wherein said step of suspending said storing and said selective activation includes discharging any excess energy in said inductive element through said pass element by applying the voltage at said output terminal to a gate of said pass element.

15. The method of claim 10 wherein said step of regulating said storing of said energy in said inductive element and said selective activation of said pass element are based solely on sensing the voltage at said output terminal.

16. The method of claim 10 wherein said step of suspending said storing and said selective activation includes comparing the voltage at said output terminal with said predetermined shut-off voltage.

17. A voltage regulating circuit capable of performing step-up and step-down operations comprising:

an inductor coupled between an input terminal and an output terminal;

a synchronous rectifier connected in series with said inductor between said inductor and said output terminal;

a steering arrangement coupled to said synchronous rectifier to control a voltage bias of said synchronous rectifier, said steering arrangement being connected to said output terminal and an intersection node to control said voltage bias in response to the voltages at said output terminal and said node, said intersection node being located between said inductor and said synchronous rectifier;

a power switch connected to said intersection node and a low voltage terminal; and a control device coupled to said synchronous rectifier and said power switch to regulate activation and deactivation of said synchronous rectifier and said power switch, said control device being electrically connected to said output terminal via a feedback loop to monitor the voltage at said output terminal such that said regulations of said synchronous rectifier and said power switch are in response to the voltage at said output terminal.

18. The circuit of claim 17 wherein said synchronous rectifier is a metal-oxide-semiconductor transistor, the substrate of said synchronous rectifier being coupled to said steering arrangement and the gate of said synchronous rectifier being coupled to said control device.

19. The circuit of claim 18 wherein said steering arrangement includes a first switch connected between said substrate of said synchronous rectifier and said intersection node and includes a second switch connected between said substrate of said synchronous rectifier and said output terminal.

20. The circuit of claim 19 wherein said first switch is a first transistor and said second switch is a second transistor, said first and second transistors being configured such that the control node of said first transistor is coupled to said output terminal and the control node of said second transistor is coupled to said intersection node such that activation of said first and second transistors is contingent upon the voltages at said intersection node and at said output terminal.

21. The circuit of claim 17 wherein said control device is configured to deactivate said synchronous rectifier and said power switch when the voltage at said output terminal exceeds a predetermined shut-off voltage.

* * * * *